United States Patent Office 3,134,294
Patented May 26, 1964

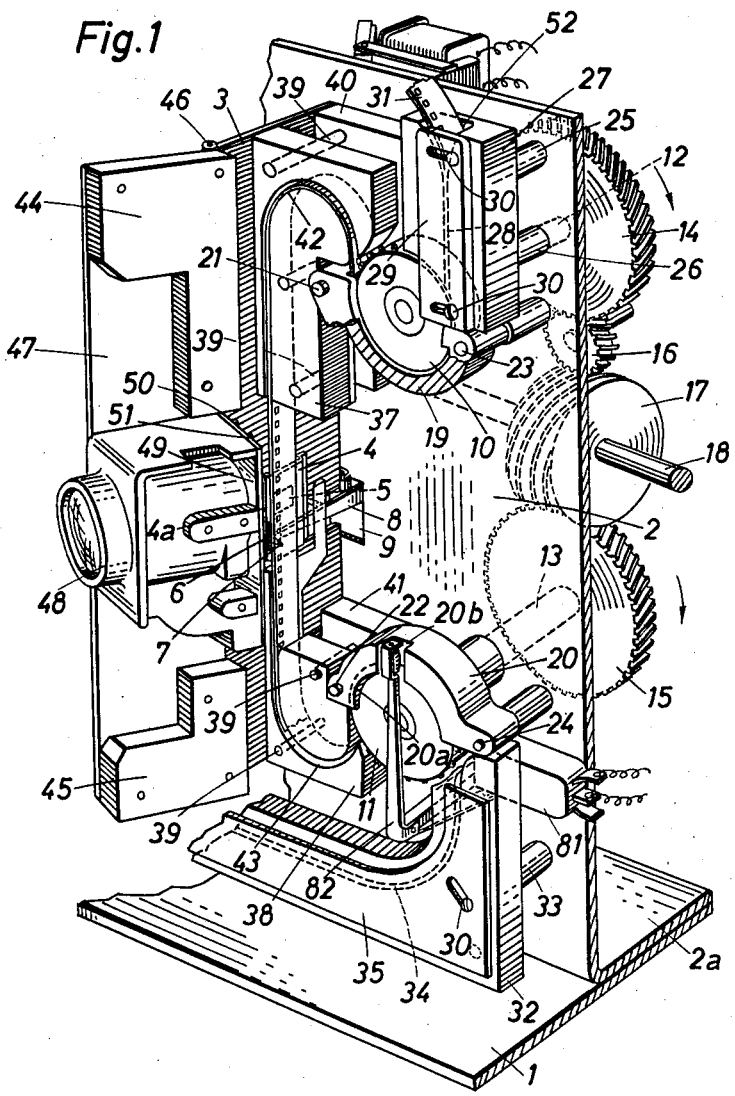

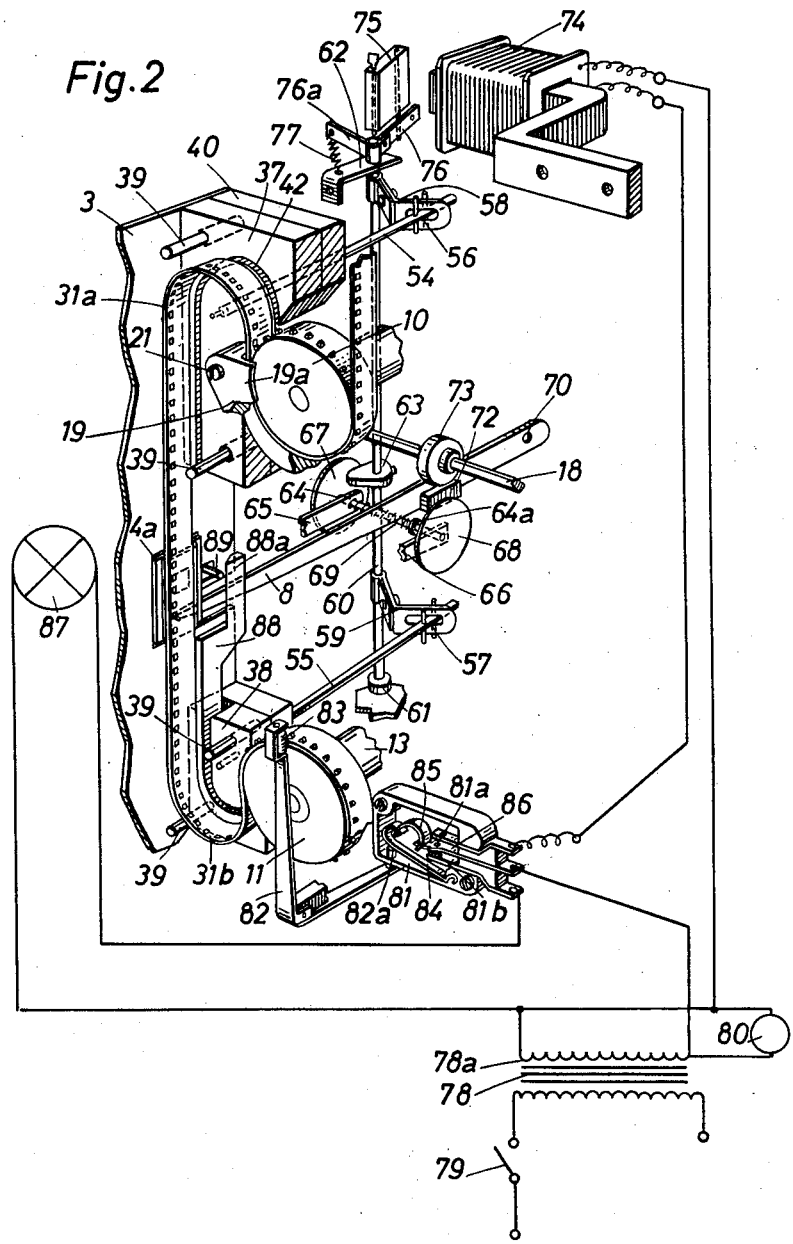

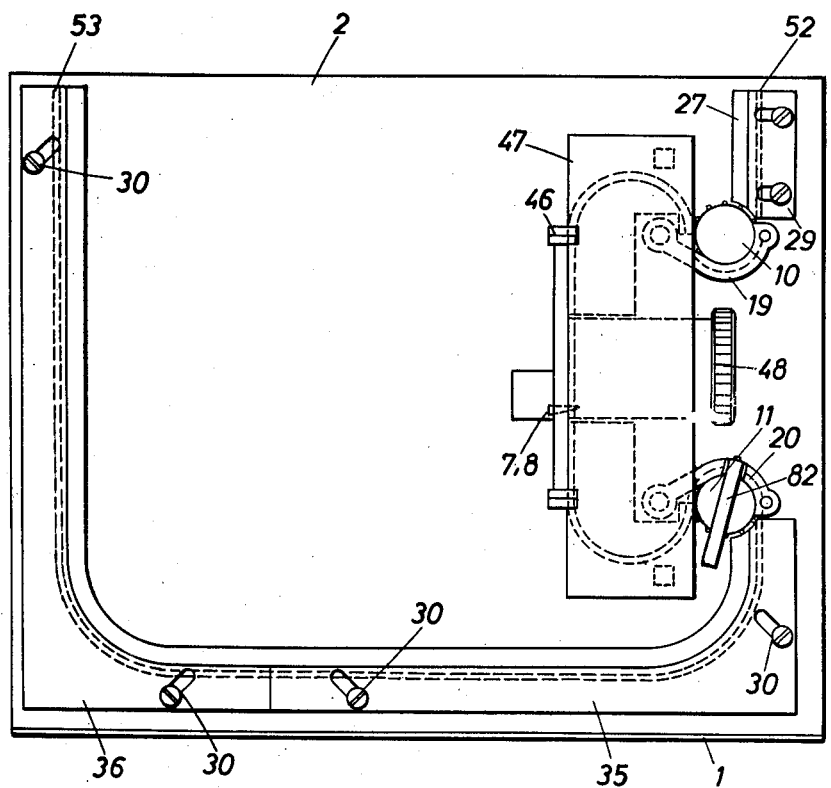

3,134,294
CINEMATOGRAPHIC APPARATUS
Willy Kaden, Munich, and Karl Bammesberger, Munich-Utermenzing, Germany, assignors to Agfa Aktiengesellschaft, Leverkusen-Bayerwerk, Germany
Filed June 16, 1961, Ser. No. 117,734
Claims priority, application Germany June 18, 1960
10 Claims. (Cl. 88—17)

The present invention relates to cinematographic apparatus such as cinematographic cameras and projectors.

More particularly, the present invention relates to that structure of a cinematographic apparatus which guides the film and which serves to form loops in the film.

As is well known, in cinematographic projectors it is necessary first to thread the film through the camera or projector, and also it is necessary to provide the film with loops before and after the optical axis to allow the film to "breathe" during the step-wise advance of the film by the claw and the continuous movement of the film by the supply and discharge sprockets.

In conventional cameras and projectors difficulties are involved in threading the film through the cinematographic apparatus preparatory to starting the operation thereof. Thus, the claw and pressure plate are in the way and must somehow be moved out of the way, and in addition it is difficult to provide proper loops. Moreover, in the case of projectors particularly, there are often portions of the film which must be cut out and it is often desirable to splice certain scenes into the film, and all of these operations create complications and extreme inconvenience because conventionally it is necessary to run the film through until the selected part where the splicing is to take place is reached, then it is necessary to run the film entirely out of the machine, make the splice and return the film again into the machine, so that a great deal of time and trouble is involved in conventional structures.

One of the objects of the present invention is to provide a cinematographic apparatus with loop-forming means which will guarantee that proper loops are formed in the film preparatory to operation of the cinematographic apparatus.

Another object of the present invention is to provide a cinematographic apparatus which requires only that the film be placed in engagement with the supply sprocket and which will then operate in a fully automatic manner not only to thread the film and provide proper loops therein but also to automatically start the operation of the apparatus after the film has been threaded properly through the cinematographic apparatus.

It is furthermore an object of the present invention to provide a structure which will automatically render elements such as the claw and pressure plate inoperative while loop-forming elements are operative and which will automatically render the loop-forming elements inoperative when the claw and pressure plate are operative.

Still another object of the present invention is to provide a structure of the above type with an electrical control means which is automatically actuated by sensing the movement of the film itself through the apparatus.

It is furthermore an object of the present invention to provide an apparatus which will make it very easy for the operator to detect where defective portions of the film are located without requiring removal of the film from the apparatus.

It is still another object of the present invention to provide a cinematographic apparatus of the above type with a film guiding structure which guides the film along both of its faces as well as both of its edges and which at the same time permits one of the edges of the film to be uncovered so that the film can become accessible at any desired part thereof located in the machine.

It is also an object of the present invention to sense the movement of the film at a part of the film which is sufficiently rigid to guarantee transmission of a force large enough to reliably actuate an electrical switch or the like.

It is furthermore an object of the present invention to provide a structure wherein the loop-forming means is required to move in only one direction away from the path of movement of the film to an inoperative position, as contrasted with conventional structures where the loop-forming elements include components which must be moved simultaneously in opposite directions.

The objects of the present invention also include the provision of a structure capable of accomplishing all of the above objects and at the same time composed of simple rugged elements which are very reliable in operation.

With the above objects in view the invention includes, in a cinematographic apparatus, a film guide means for guiding the film along a path which extends across the optical axis of the apparatus. A loop-forming means is provided for forming loops in the film before and after the optical axis, respectively, and an electrical moving means is provided for moving the loop-forming means to and from a position located in the path of movement of the film. A switch means is operatively connected to the electrical moving means for actuating the same, and this switch means is itself actuated by a sensing means which automatically senses the presence of the film at a predetermined part of the path of movement thereof, so that with this structure the moving means is automatically controlled to control the movement of the loop-forming means in a fully automatic manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective illustration of that part of a cinematographic projector which is provided with the structure of the invention, FIG. 1 showing the projector in the position where the objective is turned away from its operative position;

FIG. 2 illustrates the electrical control structure of the cinematographic projector of FIG. 1; and FIG. 3 schematically illustrates the manner in which the film is guided through the apparatus of the invention, the housing of the apparatus of FIGS. 1–3 being omitted for the sake of clarity.

Referring now to the drawings, and to FIG. 1 in particular, the projector illustrated therein includes a base plate 1 to which is fixed a substantially vertical central or intermediate wall 2 by way of a bottom flange 2a of the wall 2 which is fastened to the base plate 1. A second substantially vertical wall or plate 3 is fixed to the vertical wall 2 and extends perpendicularly thereto, as is apparent from FIG. 1. A pressure plate 4 is turnably carried by the wall 3 for movement about the vertical axis 4a, the wall 3 being provided with any suitable cutout to receive the pressure plate 4 and carrying suitable pivot pins or a single elongated rod which extends through the plate 4 along its left edge, as viewed in FIG. 1, so as to guide the plate 4 for movement to and from an operating position engaging the film to hold it in the focal plane, as is conventional. Any suitable spring structure cooperates with the plate 4 to urge it to turn around its vertical pivot axis toward the operating position where it engages the film to hold it in the focal plane. The pressure plate 4 is made of a material which has a relatively low coefficient of friction so that the film will slide easily along the pressure plate 4, and this pressure plate 4 is formed with an aperture 5 through which light may pass for the purpose of projecting an image in the case of a projector. In addition to the aperture 5 through which light passes to project the image which is carried by the film, the pressure plate 4 is formed with an elongated cutout 6 through which extends the tooth 7 of the claw 8 in the form of an elongated lever which turns up and down so that the tooth 7 will move from one perforation of the film to another in order to engage the film and advance it in a step-wise manner well known in the art. The claw 8 extends through a cutout 9 which is formed in the wall 2. The aperture 5, as well as the supply sprocket 10 and the discharge sprocket 11, described in greater detail below, are all spaced at a distance equal to several times the width of the film from the wall 2. The rotary sprockets 10 and 11 are respectively carried fixedly by shafts 12 and 13 which are supported for rotation by the wall 2 and which extend therethrough. At the side of the wall 2 opposite from the rotary sprockets 10 and 11, the shafts 12 and 13 are respectively fixed to the drive gears 14 and 15 which are respectively driven by the elements 16 and 17. Element 17 is a worm which meshes directly with the worm-wheel teeth of the gear 15 and which also meshes directly with the worm wheel 16 which in turn meshes with the gear 14 so as to drive the latter. The worm 17 is fixedly carried by a shaft 18 which is driven in an unillustrated manner by a driving motor of the apparatus.

The rotary supply sprocket 10 forms part of the means for guiding the film 31 for movement along a predetermined film path which extends across the optical axis which passes through the aperture 5, and this supply sprocket 10 is located in advance of the optical axis, while the rotary discharge sprocket 11 is located along the film path subsequent to the optical axis and also forms part of the guide means for guiding the film for movement along the path of film movement. A pair of pressure shoes 19 and 20 respectively cooperate with the sprockets 10 and 11 in a manner well known in the art so as to contribute to the guiding of the film, and these shoes 19 and 20 are respectively supported for pivotal movement by the pivot pins 21 and 22 which are fixedly carried by the wall 2. A pair of releasable detent devices 23 and 24 of any conventional well known construction releasably hold the shoes 19 and 20 in their operative positions illustrated in FIGS. 1 and 3, so that when the operator desires he may release the detents 23 and 24 and turn the shoes about their pivots 21 and 22, respectively, to inoperative positions. Such movement of the shoes 19 and 20 from their operative positions cooperating with the sprockets 10 and 11, respectively, to guide the film is not usually required, as will be apparent from the description which follows.

The film guide means of the invention includes in addition to the sprockets 10 and 11 and the shoes 19 and 20, a guide block 27 which is located directly in advance of the sprocket 10 in the path of film movement, this guide block 27 being fixedly carried by pins 25 and 26 which are in turn fixed to the wall 2. The film guiding block 27 of the film guide means of the invention is formed with a vertically extending groove 28 which receives and guides the film 31, and the lower end of the groove 28 is located just above the supply sprocket 10 between the latter and the shoe 19 so that the film will move directly from the groove 28 into the space between the sprocket 10 and the shoe 19. In order to facilitate entry of the film 31 into the groove 28 this groove is widened at its upper end so as to have a substantially funnel-shaped configuration. The groove 28 is open at its front side, as viewed in the drawing, and a closure plate 29 is provided for closing the groove 28. The closure plate 29 is formed with a pair of horizontal slots through which a pair of pins 30 extend, these pins having heads wider than and overlapping the slots and the pins are fixed to the block 27 so that the plate 29 is horizontally shiftable to and from a position covering and closing the groove 28. Thus, the plate 29 may be shifted by the operator to a position uncovering the groove 28 so that the film can be laterally moved out of the groove 28 when desired.

The film guide means also includes a block 32 for guiding the film as it moves beyond the discharge sprocket 11. The block 32 is fixedly carried by a plurality of pins 33 which are in turn fixed to the wall 2, and only one of the pins 33 is visible in FIG. 1. The manner in which the block 32 is fixed to the wall 2 is apparent from FIG. 3. This block 32 is formed with a film-receiving groove 34 which starts at the outlet formed between the sprocket 11 and the shoe 20 and which has a pair of 90° curves in it, as shown in FIG. 3, this groove ending in the region of the upper end of the wall 2. A pair of closure plates 35 and 36 are provided for closing and opening the groove 34, and these plates 35 and 36 are formed with slots which receive the pins 30 which are fixed to the block 32. These slots extend at an angle of 45° to the vertical, and it will be noted that the slots of the plate 35 are inclined oppositely to the slots of the plate 36. The plate 35 is shifted downwardly to the right, as viewed in FIG. 3, for uncovering a part of the groove 34 to render the film therein accessible, and the plate 36 is shiftable downwardly to the left, as viewed in FIG. 3, to render the film in the remaining part of the groove 34 accessible. The pins 30 which extend through the slots of the plates 35 and 36 may engage the plates 35 and 36 with a friction sufficient to hold the plates in their closed positions, respectively, shown in FIG. 3.

The structure of the cinematographic apparatus of the invention includes a pair of loop-forming means formed by the blocks 37 and 38. The blocks 37 and 38 are respectively formed with openings through which a pair of pins 39 respectively pass, these pins being fixed to and extending from wall 2, so that in this way the pins 39 serve to guide the blocks 37 and 38 for movement between the position shown in FIG. 1 where the loop-forming blocks 37 and 38 are located in the path of film movement to the inactive or rest position shown in FIG. 2 where the loop-forming means 37 and 38 are located between the wall 2 and the film 31. It will be noted that each block 37 and 38 is formed with a plurality of openings through which a plurality of the pins 39 respectively pass, so that in this way the blocks 37 and 38 are prevented from tilting and can only slide laterally with respect to the film along the pins 39 between the positions illustrated respectively in FIGS. 1 and 2. Actually the pins 39 are not fixed directly to the wall 2. Instead these pins 39 are fixedly carried by stationary blocks 40 and 41 which are in turn fixed to wall 2. In the position of the loop-forming means 37 and 38 shown in FIG. 1 the film is threaded and the pair of loop-forming means cooperate with the remaining structure to guide the path of film movement during threading thereof, as will be apparent from the description below. The block 37 is formed with the groove 42 which receives the film 31 and which has a configuration which provides the film with the loop which is located ahead of the optical axis which passes through the aperture 5, and the film is received entirely within the groove 42 so that within this groove the film is guided along its opposed faces as well as along one side edge, as was the case with the grooves 28 and 34 described above. In the same way, the lower block 38 which forms the lower loop-forming means is formed with a curved groove 43 which serves to give to the film the configuration of the loop therein which is located subsequent to the optical axis, the film reaching the lower block 38 after moving beyond the optical axis. The depth of this groove 43 is also such that the film within the groove 43, when the block 38 is in the position shown in FIG. 1, is guided along its opposed faces and along one side edge. Cover plates 44 and 45 are provided for respectively engaging the faces of the blocks 37 and 38 which are visible in FIG. 1 so as to close the grooves 42 and 43 and in this way the plates 44 and 45 serve to guide the film along its edge which is not guided in the grooves 42 and 43. Thus, as was the case with the block 27 which in cooperation with the closure plate 29 guides the film along its opposed faces and opposed edges, and also as was the case with the block 32 which in combination with the closure plates 35 and 36 guide the film on its opposed faces and its opposed edges, the blocks 37 and 38 in cooperation with the plates 44 and 45 also guide the film along its opposed faces and its opposed edges, so that in this way a completely closed passage is provided for the film which is guided on all sides. The closure plates 44 and 45 are carried by a turnable wall 47 which is pivotally connected at 46 to the wall 3 for turning movement with respect to the latter about a substantially vertical axis. The turnable wall 47 forms a support or carrier means which carries the objective 48 as well as a film guiding plate 49 provided with a pair of elongated guide ribs 50 and 51 which are adapted to be located on opposite sides of the film engaging the edges thereof to guide the film as it moves past the exposure aperture in the case of a camera and past the aperture 5 in the case of a projector through which light passes to form an image on a screen or the like. These guide ribs 51 and 50 engage the pressure plate 4 to form with the latter and the plate 49 a passageway through which the film is guided at its opposite faces and opposite edges during movement of the film past the optical axis while the film is located in the focal plane. The plate 49 and the ribs 50 and 51 are longer than the pressure plate 4, and at their portions which extend beyond the pressure plate 4 the ribs 50 and 51 engage the wall 3 to form with the latter a passage through which the film is guided on all sides as it moves toward and away from the pressure plate 4. Thus, with this structure the part of the film which is located between the sprockets 10 and 11 is guided at its opposed faces and its opposed edges in a passage which conforms closely to the dimensions of the film. The pressure shoes 19 and 20 are each provided with side flanges which extend along the side edges of the film, these flanges being shown at 20a, so that these shoes cooperate with the sprockets to form also passages in which the film is closely guided over its entire exterior surface. Therefore, with the structure of the invention there is a continuous passage completely surrounding the film starting from the entrance 52 into the groove 28 and continuing all the way up to the exit 53 formed by the upper end of the groove 34, this passage being shown in its entirety in FIG. 3. This relatively long continuous passage through which the film moves and which serves to guide the film can, however, be opened at any desired part or parts simply by shifting the plate 29 to its open position, turning the shoes 19 and/or 20 to their inoperative positions, turning the carrier wall 47 to the position shown in FIG. 1, and shifting the plates 35 and/or 36 in the manner described above to their positions opening the groove 34, so that in this way the entire film or only a selected part thereof may be released from the passage and removed partly therefrom. In this way it is possible to make any desired corrections in the film, in the case of a projector, without completely running the film through the projector, reversing the positions of the spools or reels, and then running the film a second time through the projector until the desired location of the film where a change is to be made is found. With the above-described structure of the invention it is possible to immediately have access to a portion of the film which one desires to remove, for example, or it is equally possible to splice into the film very quickly and easily without any rewinding of any type any desired scenes, titles, or the like, since any desired part of the film is rendered immediately accessible and can be withdrawn from its guide passage to be placed on a suitable splicer. Thus, all splicing operations are considerably simplified and rendered far more convenient with the structure of the invention when it is used in a projector.

As was pointed out above, the pair of loop-forming means 37 and 38 are shiftable on the pins 39 between the position shown in FIG. 1 where the pair of loop-forming means are located in the path of film movement and the position shown in FIG. 2 where these loop-forming means are in a rest position spaced from the path of film movement. In accordance with the present invention an electrical moving means is operatively connected with the pair of loop-forming means for moving the latter between their positions shown, respectively, in FIGS. 1 and 2, and also in accordance with the present invention the electrical moving means is controlled automatically by a switch and sensing means which senses the presence of the film after it has moved beyond the discharge sprocket 11. This electrical moving means and sensing means is illustrated in FIG. 2. Thus, as may be seen from FIG. 2 the pair of loop-forming means 37 and 38 are respectively fixed to elongated rods 54 and 55 which extend through suitable openings in the plates 40 and 41 and in the wall 2 through the latter to the side of the wall 2 which is opposite to that shown in FIG. 3. The free ends of the rods 54 and 55 which are distant from the blocks 37 and 38 extend freely through slots formed in a pair of levers 58 and 59, respectively, and the rods 54 and 55 each carry a pair of cross pins respectively engaging opposed faces of each lever so that in this way the rods 54 and 55 are respectively connected with the levers 58 and 59 through pin-and-slot connections 56 and 57, respectively. The levers 58 and 59 are fixedly carried by a rotary shaft 60 which extends vertically, and the lower end of the shaft 60 is supported for rotary movement in a bearing 61 which is carried by the flange 2a, and the upper end portion of the shaft 60 passes through an opening in a lug 62 which is fixed to the wall 2, so that in this way the element 62 serves as a bearing for the upper end portion of the shaft 60, and in this way the shaft 60 is guided for rotary movement about its axis. This shaft 60 also fixedly carries a cam 63. The wall 2, in addition to carrying the bearing arm 62, carries a pair of bearing arms 65 and 66 respectively formed with openings through which a rod 64 passes so as to be guided by the bearing arms 65 and 66 for axial movement in a direction parallel to the optical axis. The rod 64 fixedly carries at its outer ends which are located respectively beyond the bearing arms 65 and 66 a pair of discs 67 and 68. A coil spring 69 is coiled about the rod 64, engages at one of its ends the bearing arm 65 and presses with its opposite ends against a collar 64a fixedly carried by the rod 64, so that in this way the disc 67 is urged toward and maintained in engagement with the cam 63.

The elongated claw lever 8 is supported for pivotal movement about an axis parallel to the optical axis by a bearing pin extending into opening 70 of lever 8 and carried by a suitable stationary part of the cinematographic apparatus, and the pivotal claw lever 8 fixedly carries a plastic strip 72 which has its upper face in engagement with a cam 73 which is fixed to the drive shaft 18 for rotation therewith. This cam 73 is simply in the form of a disc fixed eccentrically to the shaft 18 so that during rotation of the latter the eccentric disc or cam 73 will engage the strip 72 in order to reciprocate the claw, and any suitable spring which is not illustrated urges the claw 8 upwardly so as to maintain it at all times in engagement, through its plastic strip 72, with the cam or eccentric disc 73. The lever 8 is an elongated springy member, and the film-engaging tooth thereof is shaped so that this tooth will ride out of a perforation during upward movement of the claw, the claw yielding in opposition to its own resiliency while the claw tooth rides out of one perforation and when reaching the next upper perforation will snap into the latter, and the lower edge of the tooth is such that during downward movement of the claw the film is advanced. This strip 72 is also engaged, at its face which is directed away from the claw lever 8, by the disc 68 under certain conditions as will be apparent from the description which follows.

During normal operation of the camera or projector the disc 68 does not engage the strip 72 which is fixed to the claw 8. However, when the shaft 60 is turned in a clockwise direction, as viewed from above, the levers 58 and 59 act on the rods 54 and 55 to shift the pair of loop-forming means 37 and 38 along the pins 39 away from the wall 2 into the film-threading position shown in FIG. 1, and at the same time the cam 63 acts on the disc 67 to shift the rod 64 axially in opposition to the spring 69 so as to move the disc 68 into engagement with the strip 72 and thus move the claw 8 in opposition to its own inherent resiliency to the left, as viewed in FIG. 2, at the free end of the claw 8 which is provided with the film-engaging tooth, and in this way the claw 8 is moved to an inoperative position where it cannot engage the film. It is only necessary for the operator to manually introduce the film into the groove 28 and beyond the latter through only the slight distance necessary for the first one or two perforations of the film to be engaged by the teeth of the supply sprocket 10. The operator need not advance the film further with the structure of the invention. The rotary movement of the sprocket 10 will automatically advance the film around the sprocket 10 beyond the latter and through the remaining continuous passageway up to the sprocket 11, and the sprocket 10 rotates at a uniform speed to provide a uniform feeding of the film in a fully automatic manner through the loop-forming means 37, past the optical axis and through the loop-forming means 38 to the sprocket 11. When the shaft 60 turns in the opposite direction, counterclockwise as viewed from above, then the pair of loop-forming means move away from the path of film movement and the claw 8 is returned to its operative position where it advances the film in a step-wise manner at the portion of the film which is located between the sprockets 10 and 11, and with the pair of loop-forming means returned to their rest position shown in FIG. 2 it is possible for the film loops 31a and 31b shown in FIG. 2 to "breathe" freely during the step-wise advancing of the film by the claw 8 in combination with the rotary movement of the sprockets 10 and 11. The lower loop-forming means 38 carries an extension 88 which may be integral with or fixed to the block 38, and this extension 88 extends upwardly and is formed with an elongated camming portion 88a which also extends upwardly. Upon movement of the lower loop-forming means 38 into the path of film movement due to turning of the shaft 60 in a clockwise direction, as described above, the camming portion 88a of the extension 88 engages a pin 89 which is fixed to and extends from the pressure plate 4 at a portion thereof distant from its turning axis 4a, and in this way the camming portion 88a cooperates with the pin 89 to turn the pressure plate 4 about the axis 4a in opposition to the unillustrated spring which urges the pressure plate to turn toward the film, and thus when the lower loop-forming means 38 is in the path of film movement the elements 88 and 89 cooperate to locate the pressure plate in a fully automatic manner in an inoperative position spaced from and out of engagement with the film.

The electrical moving means includes in addition to the above-described mechanical transmission structure a solenoid composed of the electromagnet 74 and the armature 75. The armature 75 is fixed to one arm of a bell crank 76 which is in turn fixed to the shaft 60. The other arm 76a of the bell crank 76 is fixed to one end of the spring 77 whose opposite end is fixed to the bearing arm 62, so that the spring 77 urges the shaft 60 to turn in a counterclockwise direction, as viewed from above, to the position where the pair of loop-forming means 37 and 38 are spaced from the path of film movement and where, as a result, the claw 8 can cooperate with the film to advance the latter and the pressure plate 4 engages the film to hold it in the focal plane. The coil 74 of the solenoid is connected electrically with the secondary winding 78a of a transformer 78 so as to receive its current therefrom, and in the circuit of the primary winding of the transformer is located a manually operable switch 79 which is available to the operator for starting the cinematographic apparatus. The motor 80 which drives the shaft 18 is connected directly in the circuit of the secondary winding 78a, while the coil 74 of the electromagnet is connected to the secondary winding through a switch means 81 which is in the form of a double-throw snap-switch which has an intermediate contact 81a adapted to be moved in a manner well known in the art either upwardly, as viewed in FIG. 2, into engagement with one contact or downwardly into engagement with another contact 81b. The switch means 81 is actuated by way of a sensing means formed by a bell crank lever 82 supported for turning movement about an axis parallel to the optical axis by any suitable stationary part of the structure, and this bell crank 82 turnably carries at its upper free end portion a sensing roller 83 which is freely turnable and which is located in a notch 20b formed in the lower shoe 20 which cooperates with the rotary discharge sprocket 11. This sensing roller 83 is located in the path of movement of the perforated edge portion of the film at a part of the film which extends around the sprocket 11. Because of the curvature of the film as it passes around the sprocket 11 and because of the teeth of the sprocket which extend through the perforations of the film the film is exceedingly stiff at its edge portion which engages the sensing roller 83 and is therefore capable of transmitting relatively large forces for reliably actuating the switch 81.

Therefore, as soon as the leading end of the film 31 reaches the sensing roll 83, the bell crank 82 is turned so that its end distant from the sensing roll 83 moves upwardly, and this upwardly moving end of the bell crank 82 engages a pin 82a which extends upwardly into the housing of the switch 81 into engagement with a lever 84 of the switch. The upward movement of the pin 82a causes the lever 84 to turn so as to actuate the snap spring 85 and move the intermediate leaf spring 86 of the switch, this leaf spring carrying the intermediate contact 81a, downwardly so that in this way the circuit in which the electromagnet 74 is located becomes opened. The switch 81 normally maintains the intermediate contact 81a in an upper position engaging the contact carried by the upper leaf spring of the switch so as to close the circuit of the electromagnet 74, and it is only when the bell crank 82 turns upon engagement of the edge of the film with the roller 83 that the switch 81 is actuated so as to open the circuit of the electromagnet 74. Thus, when the operator closes the switch 79, before the film has moved beyond the sprocket 10, the solenoid is immediately energized and of course the motor 80 starts running, so that initially the pair of loop-forming means are automatically located in the path of film movement to form automatically the loops 31a and 31b and of course at this time the claw and pressure plate are rendered inoperative in the manner described above. However, as soon as the structure has operated, after closing of the switch 79 and manual placing of the film in engagement with the sprocket 10, to advance the film to the sprocket 11, the leading end of the film will engage the roller 83 to actuate the switch 81 and open the circuit of the solenoid 74, so that now the spring 77 will return the parts to their rest positions, and thus the pair of loop-forming means 37 and 38 will move away from the path of film movement and the claw 8 and pressure plate 4 will return to their operative positions. The continued rotary movement of the sprocket 11 continues to advance the film through the elongated groove 34 described above. Thus, as soon as the film reaches the roller 83 the pair of loop-forming means are rendered inoperative and the film is in this way provided with free loops 31a and 31b which can move freely during "breathing" of the film. The turning of the lever 82 by engagement of the sensing roller 83 with the perforated edge portion of the film 31 not only results in opening of the circuit of the electromagnet 74, but in addition the downward movement of the leaf spring 85 places the intermediate contact 81a in engagement with the contact 81b for closing the circuit of the lamp 87 of the projector, shown diagrammatically in FIG. 2, so that in this way in a fully automatic manner after the film has been automatically threaded through the projector the projecting lamp 87 is energized.

Thus, with the structure of the invention all that the operator need do is introduce the film through the guiding groove 28 into engagement with the sprocket 10 and then to close the switch 79, and all of the remaining operations take place in a fully automatic manner. The operator need do nothing more.

In accordance with the present invention, all of the parts which cooperate to form any part of the passage through which the film is guided are made of a suitable transparent material, such as a suitable plastic, so that when the housing of the cinematographic apparatus is open it is possible to visually observe the manner in which the film moves through the apparatus, and in this way it is possible to easily and quickly detect any improper operation of the apparatus or damaging of the film, or the like.

It will be understood that each of the elements described above, or two or more together, may also find a useful application in other types of cinematographic apparatus differing from the types described above.

While the invention has been illustrated and described as embodied in automatic threading arrangement for cinematographic apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

What is claimed as new and desired to be secured by Letters Patent is:

1. In a cinematographic apparatus, in combination, film guide means for guiding film for movement along a path which extends across the optical axis of the apparatus, said guide means including a rotary discharge sprocket located along the film path subsequent to the optical axis for moving the film away from the optical axis; a pair of loop-forming means located along the film path respectively before and after the optical axis for forming loops in the film before and after the optical axis; electrical moving means operatively connected to said pair of loop-forming means for moving the latter to and from a position located in the path of movement of the film; and sensing means located in the region of said discharge sprocket for sensing the presence of film at said discharge sprocket, said sensing means cooperating operatively with said moving means for actuating the same to control the position of said pair of loop-forming means, said sensing means including an electrical switch and a feeler operatively connected to said switch for actuating the same, said feeler including a roller located in the path of movement of an edge of the film at said discharge sprocket to be engaged by said edge of the film for moving said feeler and actuating said switch, said roller being located beside an outer peripheral portion of said discharge sprocket for engaging a film edge of a portion of the film which is curved on the discharge sprocket so that the edge portion of the film which engages said roller is relatively stiff.

2. In a cinematographic apparatus, in combination, film guide means for guiding film for movement along a path which extends across the optical axis of the apparatus, said guide means including a rotary discharge sprocket located along the film path subsequent to the optical axis for moving the film away from the optical axis; a pair of loop-forming means located along the film path respectively before and after the optical axis for forming loops in the film before and after the optical axis; electrical moving means operatively connected to said pair of loop-forming means for moving the latter to and from a position located in the path of movement of the film; and sensing means located in the region of said discharge sprocket for sensing the presence of film at said discharge sprocket, said sensing means cooperating operatively with said moving means for actuating the same to control the position of said pair of loop-forming means, said sensing means including an electrical switch and a feeler operatively connected to said switch for actuating the same, said feeler including a roller located in the path of movement of an edge of the film at said discharge sprocket to be engaged by said edge of the film for moving said feeler and actuating said switch, said electrical moving means and said switch being located in an electrical circuit which includes a manually operable switch for closing said circuit to start the operation of the apparatus, and said switch being electrically connected to said electrical moving means for deenergizing the latter when said switch is opened.

3. In a cinematographic projector, in combination, film guide means for guiding film for movement along a predetermined path extending across the optical axis of the projector; a pair of loop-forming means respectively located before and after the optical axis for forming loops in the film before and after the optical axis; electrical moving means operatively connected to said pair of loop-forming means for moving the latter to positions respectively located in the path of film movement when said electrical moving means is energized; spring means operatively connected to said pair of loop-forming means for moving the latter to rest positions, respectively, away from the path of film movement when said electrical moving means is unenergized; a projection lamp; electrical switch means operatively connected to said electrical moving means and said lamp for alternately energizing said moving means and lamp; and sensing means for sensing the film when it has moved beyond the loop-forming means which is located along the film path subsequent to the optical axis, said sensing means being operatively connected to said switch means for placing the latter in a position energizing said moving means and deenergizing said lamp before film has moved beyond said loop-forming means which is located subsequent to the optical axis and actuating said switch means to deenergize said electrical moving means and energize said lamp after the film has moved beyond said latter loop-forming means.

4. In a cinematographic apparatus, in combination, film guide means for guiding film for movement along a path which extends across the optical axis of the apparatus; a pair of loop-forming means movable to and from a position located in the path of film movement for forming loops in the film before and after the optical axis; an elongated shaft; support means supporting said shaft for rotary movement; a pair of lever means fixed to said shaft for turning movement therewith and operatively connected to said pair of loop-forming means for moving the latter to and from said position when said shaft turns in one direction or the other; solenoid means including an armature operatively connected to said shaft for turning the same when said solenoid means is energized; switch means operatively connected to said solenoid means for energizing and deenergizing the same; and sensing means located in the path of film movement to sense the film as it moves along said path and operatively connected to said switch means for actuating the latter to control said solenoid means and thus control the movement of said pair of loop-forming means to and from said position.

5. In a cinematographic apparatus, in combination, film guide means for guiding film for movement along a path which extends across the optical axis of the apparatus; a pair of loop-forming means movable to and from a position located in the path of film movement for forming loops in the film before and after the optical axis; an elongated shaft; support means supporting said shaft for rotary movement; a pair of lever means fixed to said shaft for turning movement therewith and operatively connected to said pair of loop-forming means for moving the latter to and from said position when said shaft turns in one direction or the other; solenoid means including an armature operatively connected to said shaft for turning the same when said solenoid means is energized; switch means operatively connected to said solenoid means for energizing and deenergizing the same; sensing means located in the path of film movement to sense the film as it moves along said path and operatively connected to said switch means for actuating the latter to control said solenoid means and thus control the movement of said pair of loop-forming means to and from said position; a cam fixed to said shaft for turning movement therewith; claw means cooperating with the film for advancing the same in a stepwise manner; and transmission means actuated by said cam and cooperating with said claw means for moving the latter to an inoperative position out of engagement with the film when said pair of loop-forming means are in said position in the path of film movement and for freeing said claw means for movement to an operative position engaging the film when said pair of loop-forming means are in an inoperative position out of the path of film movement.

6. In a cinematographic apparatus, in combination, film guide means for guiding film for movement along a path which extends across the optical axis of the apparatus; a pair of loop-forming means movable to and from a position located in the path of film movement for forming loops in the film before and after the optical axis; an elongated shaft; support means supporting said shaft for rotary movement; a pair of lever means fixed to said shaft for turning movement therewith and operatively connected to said pair of loop-forming means for moving the latter to and from said position when said shaft turns in one direction or the other; solenoid means including an armature operatively connected to said shaft for turning the same when said solenoid means is energized; switch means operatively connected to said solenoid means for energizing and deenergizing the same; sensing means located in the path of film movement to sense the film as it moves along said path and operatively connected to said switch means for actuating the latter to control said solenoid means and thus control the movement of said pair of loop-forming means to and from said position; pressure plate means cooperating with the film for holding the film in the focal plane, said pressure plate means being movable to and from an operative position engaging the film; and means carried by one of said loop-forming means and cooperating with said pressure plate means for moving the same away from said operative position when said one loop-forming means is in the path of film movement.

7. In a cinematographic apparatus, in combination, film guide means for guiding film for movement along a path extending across the optical axis of the apparatus; a pair of loop-forming means for forming loops in the film before and after the optical axis, each loop-forming means being in the form of a block formed with a groove which receives the film and which has three surfaces guiding the film along its opposite faces and along one edge thereof; support means supporting said pair of loop-forming means for movement together in a straight path extending perpendicular to said path of movement of the film to and from a position where the film is received in said grooves; objective means having an operative position located along said optical axis; carrier means carrying said objective means for movement to and from said position extending along the optical axis, said carrier means having portions which respectively close said grooves of said loop-forming means when said objective means is along said optical axis so that the film is guided along both edges as well as along both faces by the cooperation of said pair of loop-forming means and said carrier means when said pair of loop-forming means are located along the path of film movement.

8. A cinematographic apparatus, in combination, film guide means for guiding film along a path extending across the optical axis of the apparatus, said film guide means including a rotary supply sprocket located before the optical axis, a rotary discharge sprocket located subsequent to the optical axis, a supply guide located immediately prior to said rotary supply sprocket and including a block formed with a groove guiding the film during movement toward said supply sprocket along opposed faces and one edge thereof, and a closure plate shiftable with respect to said block to a position closing and opening said groove so that when said plate closes said groove the film is guided along both of its edges as well as said opposite faces thereof, and said guide means including adjacent but subsequent to said discharge sprocket a second block formed with a groove receiving the film from said discharge sprocket and guiding the film along one edge and opposed faces thereof, and a second closure plate cooperating with said second block for closing and opening said groove thereof so that when said second plate closes said groove of said second block the film is guided by said second block along both of its edges as well as said opposed faces thereof; and a pair of loop-forming means respectively located between said sprockets and the optical axis along the path of film movement for forming loops in the film, said loop-forming means being movable to and from a position located in the path of film movement.

9. A cinematographic apparatus, in combination, film guide means for guiding film along a path extending across the optical axis of the apparatus, said film guide means including a rotary supply sprocket located before the optical axis, a rotary discharge sprocket located subsequent to the optical axis, a supply guide located immediately prior to said rotary supply sprocket and including a block formed with a groove guiding the film during movement toward said supply sprocket along opposed faces and one edge thereof, and a closure plate shiftable with respect to said block to a position closing and opening said groove so that when said plate closes said groove the film is guided along both of its edges as well as said opposite faces thereof, and said guide means including adjacent but subsequent to said discharge sprocket a second block formed with a groove receiving the film from said discharge sprocket and guiding the film along one edge and opposed faces thereof, and a second closure plate cooperating with said second block for closing and opening said groove thereof so that when said second plate closes said groove of said second block the film is guided by said second block along both of its edges as well as said opposed faces thereof, said closure plates being shiftable in directions extending transversely with respect to the film.

10. A cinematographic apparatus, in combination, film guide means for guiding film along a path extending across the optical axis of the apparatus, said film guide means including a rotary supply sprocket located before the optical axis, a rotary discharge sprocket located subsequent to the optical axis, a supply guide located immediately prior to said rotary supply sprocket and including a block formed with a groove guiding the film during movement toward said supply sprocket along opposed faces and one edge thereof, and a closure plate shiftable with respect to said block to a position closing and opening said groove so that when said plate closes said groove the film is guided along both of its edges as well as said opposite faces thereof, and said guide means including adjacent but subsequent to said discharge sprocket a second block formed with a groove receiving the film from said discharge sprocket and guiding the film along one edge and opposed faces thereof, and a second closure plate cooperating with said second block for closing and opening said groove thereof so that when said second plate closes said groove of said second block the film is guided by said second block along both of its edges as well as said opposed faces thereof, said blocks and plates being respectively made of a transparent material so that the film is visible while moving through said grooves; and a pair of loop-forming means respectively located between said sprockets and the optical axis along the path of film movement for forming loops in the film, said loop-forming means being movable to and from a position located in the path of film movement.

References Cited in the file of this patent

UNITED STATES PATENTS

| | | |
|---|---|---|
| 1,993,735 | Foster et al. | Mar. 12, 1935 |
| 2,142,493 | Carpenter | Jan. 3, 1939 |
| 2,203,655 | Lechleitner et al. | June 4, 1940 |
| 2,327,776 | Fairbanks et al. | Aug. 24, 1943 |
| 2,420,587 | Dietrich | May 13, 1947 |
| 2,807,979 | Henriksen | Oct. 1, 1957 |
| 2,983,416 | Hanken et al. | May 9, 1961 |